(12) United States Patent
Takaku

(10) Patent No.: US 7,593,964 B2
(45) Date of Patent: Sep. 22, 2009

(54) MULTIMEDIA DATA PROCESSING APPARATUS AND MULTIMEDIA DATA PROCESSING METHOD

(75) Inventor: Masahiko Takaku, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 307 days.

(21) Appl. No.: 11/300,498

(22) Filed: Dec. 15, 2005

(65) Prior Publication Data

US 2006/0143235 A1 Jun. 29, 2006

(30) Foreign Application Priority Data

Dec. 24, 2004 (JP) .............................. 2004-374612

(51) Int. Cl.
*G06F 17/30* (2006.01)
(52) U.S. Cl. .................................................. 707/104.1
(58) Field of Classification Search ...................... 707/2, 707/104.1, 205; 348/231.3, 333.02; 711/164
See application file for complete search history.

(56) References Cited

U.S. PATENT DOCUMENTS

| | | | | |
|---|---|---|---|---|
| 5,689,303 A | * | 11/1997 | Kuroiwa | ................... 348/231.3 |
| 6,829,624 B2 | * | 12/2004 | Yoshida | ....................... 707/205 |
| 7,127,580 B2 | * | 10/2006 | Takeuchi et al. | ............. 711/164 |
| 7,149,930 B2 | | 12/2006 | Ogawa et al. | .................. 714/42 |
| 2001/0052911 A1 | * | 12/2001 | Boyle et al. | ................... 345/763 |
| 2002/0093571 A1 | | 7/2002 | Hyodo | ......................... 348/220 |
| 2003/0190954 A1 | * | 10/2003 | Sitrick | ......................... 463/35 |
| 2004/0179124 A1 | * | 9/2004 | Morimoto et al. | ....... 348/333.02 |
| 2005/0234983 A1 | * | 10/2005 | Plastina et al. | ............ 707/104.1 |

FOREIGN PATENT DOCUMENTS

| | | |
|---|---|---|
| JP | 2002-218384 | 8/2002 |
| JP | 2003-219325 | 7/2003 |
| JP | 2004-030771 | 1/2004 |
| JP | 2004-158928 | 6/2004 |

* cited by examiner

*Primary Examiner*—Etienne P LeRoux
(74) *Attorney, Agent, or Firm*—Fitzpatrick, Cella, Harper & Scinto

(57) ABSTRACT

During obtaining new multimedia data, the multimedia data is automatically added to an original file, and a user interface which is used to select whether to record the multimedia data while being added to the original file or to separate the added multimedia data from the original file and create a new file for recording the added multimedia data is provided after the multimedia data is obtained.

21 Claims, 13 Drawing Sheets

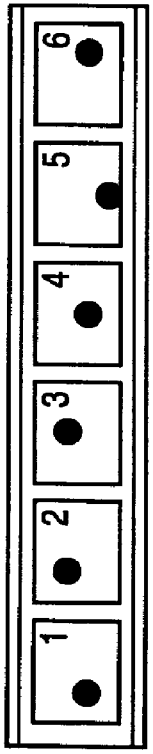
FIG. 9A RECORDED MP4 FILE
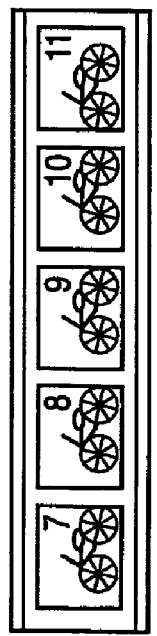
FIG. 9B MOVING IMAGE TO BE ADDED
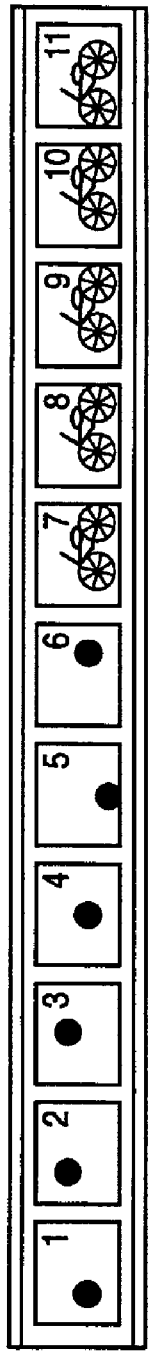
FIG. 9C COMBINED MP4 FILE BY SIMPLE ADDITION
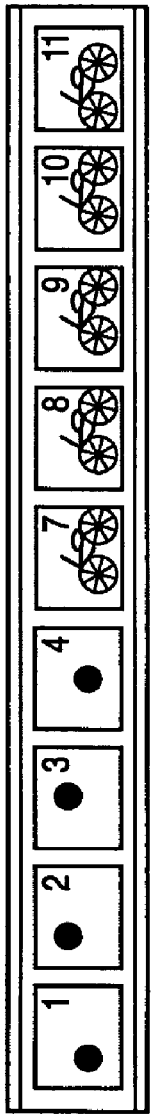
FIG. 9D MP4 FILE OBTAINED BY OVERWRITING ADDITION

MULTIMEDIA DATA PROCESSING APPARATUS AND MULTIMEDIA DATA PROCESSING METHOD

FIELD OF THE INVENTION

The present invention relates to a multimedia data processing apparatus and method, which add multimedia data on to an existing file to generate a single file and separate the added data from the single file.

BACKGROUND OF THE INVENTION

Along with the widespread use of imaging devices such as a digital-still camera, digital video camera, and the like, multimedia data including digital moving image data, audio data, and the like can be readily handled.

Conventionally, it is a common practice to record multimedia data by a digital video camera or the like on a tape medium. However, in recent years, video cameras and the like which comprise a semiconductor memory, magnetic disk, optical disk, and the like, and can record multimedia data on these media have become increasingly prevalent. Also, digital still cameras, which can record moving image data, have prevailed, and the user can similarly capture a moving image in the same manner as a still image.

In this way, imaging devices that record multimedia data (to be generally and simply referred to as "digital cameras" hereinafter) generally have a function of capturing and recording moving image data beyond the borders of conventional imaging devices.

In a digital camera of this type which has a function of capturing and recording moving image data, it is a common practice to generate one moving image file per moving image capturing operation, and to record the file in a semiconductor memory or the like.

Since captured moving image data is recorded as a single moving image file, which is independent of other files, the user can handle this moving image file in the same way as individual still image files. For this reason, for example, when the user loads files to a personal computer, the files can be easily managed independently of their contents (moving or still images). Also, the user can easily exchange moving image data via e-mail messages.

In case of an imaging device that records moving image data on a tape medium, the captured moving image data is sequentially recorded in the order of capturing due to the recording on a magnetic tape.

However, in a case where moving image data is recorded on a semiconductor memory or the like that allows random access, such limitation is not imposed, and an imaging device can individually handle the moving image files at random sequence. For this reason, in order to meet a demand for sequentially handling plural moving image data, a function such as a play list independent from moving image files must be used, or processing for editing (combining) individual moving image files on a personal computer or the like must be done.

Under such circumstances, a technique which aims at avoiding complicated operations, ordering errors, and the like upon editing/playback in consideration of sequence like tape media has been proposed. For example, it has been proposed to set a digital camera to combine moving image data to be captured with an existing moving image file, and to generate the captured moving image data as a single continuous moving image file. For further details, refer to Japanese Patent Laid-Open Nos. 2002-218384 and 2003-219325.

Upon capturing a moving image by a digital camera in Japanese Patent Laid-Open Nos. 2002-218384 and 2003-219325, it is set whether to add a captured image on to an existing moving image file to record as a single file including the existing moving image file or to record a captured image as a single file independent from the existing moving image file. Next, in a case where a moving image is captured in a state of setting for adding the captured image on to an existing moving image file, the digital camera adds the captured moving image on to the existing moving image file so as to update the existing moving image file.

However, in the conventional method, whether or not to add a moving image to the existing moving image file must be set prior to capturing of the moving image. In order to decide whether or not to add a moving image to the existing moving image file, it is necessary to predict what type of moving image is to be captured. For example, in limited scenes such as "athletic meeting", "marriage ceremony", and the like, a moving image to be captured can be predicted to some extent. However, in general, it is difficult to predict a moving image to be captured. As a result, an unintended moving image may be added, or after a moving image is recorded as a single file, the user may regret not having added it to the existing file.

Upon adding a moving image, when the user wants to add the moving image by overwriting a part of the existing moving image file, in place of adding it from the end of an existing moving image file, it is very difficult to determine an overwrite location prior to capturing an image. This results in poor flexibility.

SUMMARY OF THE INVENTION

It is a feature of the present invention to solve the conventional problems.

A characteristic feature of the present invention is to obviate the need for setting by a user whether or not to add a captured (input) moving image on to an existing (input) moving image file to generate a single file prior to capturing image.

Also, a characteristic feature of the present invention is to provide a multimedia data processing apparatus and method, which allow a user to determine whether or not to separate the added moving image from a single moving image file, after the single moving image file is created by adding a captured (inputted) moving image to an existing file.

According to an aspect of the present invention, there is provided with a multimedia data processing apparatus comprising: obtaining means for obtaining multimedia data; addition means for adding second multimedia data obtained by the obtaining means on to a first file including first multimedia data stored in a storage medium so as to record as a combined file in the storage medium; and separation means for separating the second multimedia data from the combined file and creating a second file including the second multimedia data, with respect to a separation instruction.

According to another aspect of the present invention, there is provided with a multimedia data processing method comprising: an obtaining step of obtaining multimedia data; an addition step of adding second multimedia data obtained in the obtaining step on to a first file including first multimedia data stored in a storage medium so as to record as a combined file in the storage medium; and a separation step of separating the second multimedia data from the combined file and creating a second file including the second multimedia data, with respect to a separation instruction.

Other features, objects and advantages of the present invention will be apparent from the following description

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 9A depicts a conceptual view of overwriting addition processing;

FIG. 9B depicts a conceptual view of overwriting addition processing;

FIG. 9C depicts a conceptual view of overwriting addition processing;

FIG. 9D depicts a conceptual view of overwriting addition processing;

DETAILED DESCRIPTION OF PREFERRED EMBODIMENTS

Embodiments that help understand the broader, middle, and narrower concepts of the present invention will be described hereinafter. The appended claims do not always describe all concepts included in the following embodiments. However, it should be understood that these concepts are not intentionally excluded from the technical scope of the patent invention.

First Embodiment

Figure 1:
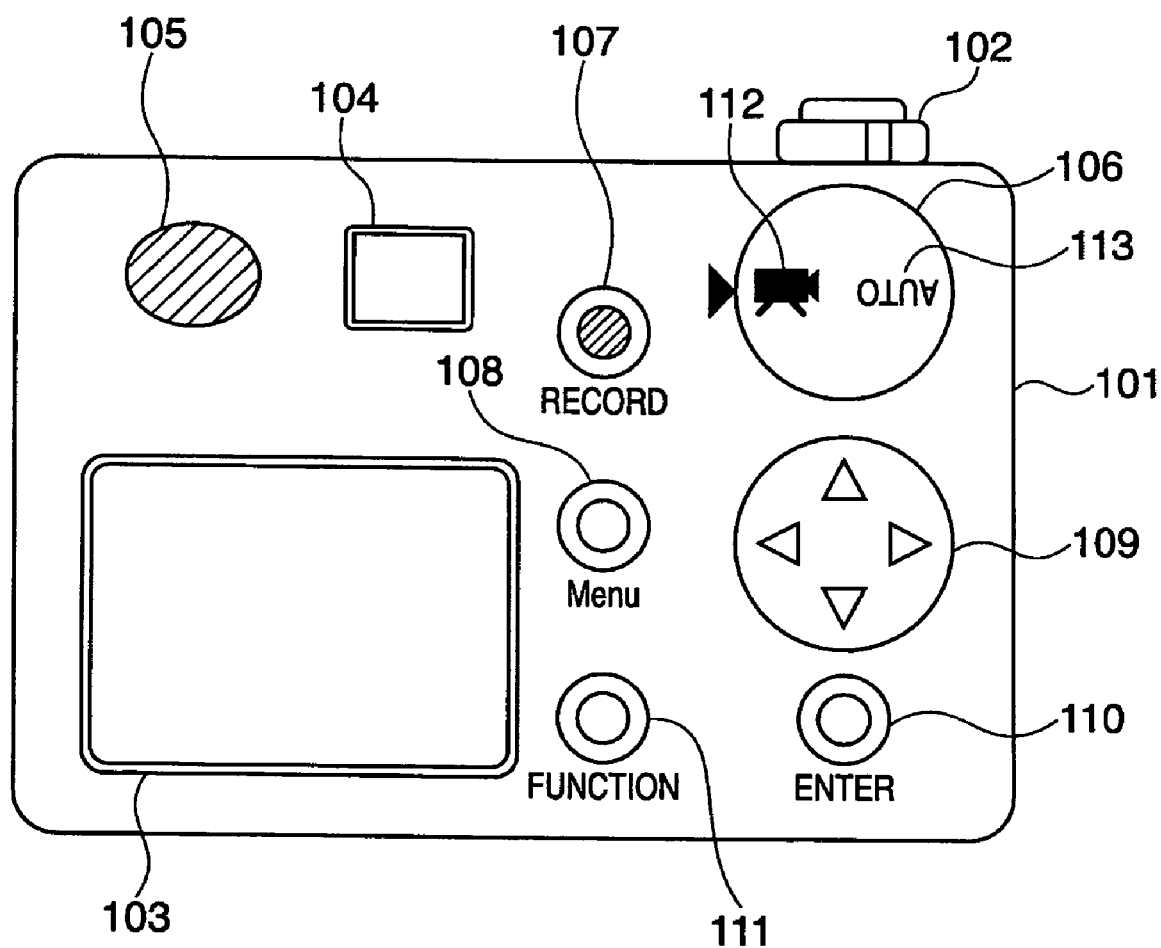
FIG. 1 depicts a rear view of a digital camera according to an embodiment of the present invention.

FIG. 1 depicts a rear view of a digital camera 101 as an example of an imaging device according to the present invention. Due to multi-functions and improvement of operations of a digital camera in recent years, various additaments (e.g., a dial for diopter adjustment and the like) are arranged on the rear surface of the digital camera, but they are omitted from FIG. 1.

The digital camera 101 comprises a power switch 102 used to turn on/off an electric power supply, and a display unit 103 used to play back a captured image and to display a message that prompts a user to make operations. The digital camera 101 also comprises a viewfinder 104 which provides easy-to-see and uniform display even in a bright environment, and a loudspeaker 105 used to output audio data. Furthermore, the digital camera 101 comprises a mode change dial 106 used to switch between a moving image mode and a still image mode, and to easily set parameters optimal to imaging conditions such as a night mode, sports mode, and the like. Moreover, the digital camera 101 comprises a recording start/stop button 107 (which serves as a shutter button upon capturing a still image) used to instruct start or stop of recording of a moving image, and a menu button 108 used to instruct display of various operation menus on the display unit 103. In addition, the digital camera 101 comprises an arrow key 109 used in a so-called pointer operation by the user for selecting functions in accordance with menu items displayed on the display unit 103, and an enter button 110 used to instruct to determine the selected contents. Also, the digital camera 101 comprises a function call button 111 used to call a function depending on the condition, and the like.

The display unit 103 and viewfinder 104 serve to inform the user of an image to be captured by displaying a digitally-processed image to be captured in real time. Also, the display unit 103 and viewfinder 104 are used to display the contents of operations (e.g., basic settings of the camera) when the user presses the menu button 108.

The mode change dial 106 is used for the purpose of selecting a pre-set imaging parameter so as to easily set parameters associated with the imaging conditions. In the digital camera 101 shown in FIG. 1, the mode change dial 106 has only a moving image capture mark 112 and an AUTO mark 113 for the sake of simplicity. The moving image capture mark 112 selects a moving image capture mode and the AUTO mark 113 selects auto settings of the imaging conditions for a still image. Upon selecting the mark by turning the mode change dial 106, the user can select a still image capturing mode or the moving image capturing mode that gives specific imaging parameters.

For example, on a conventional digital camera, a mark that makes settings suited to night imaging, a mark suited to portrait imaging, and the like are printed on a dial, and when the user turns the dial and selects such mark according to the intended purpose, he or she can do imaging corresponding to desired imaging conditions.

In FIG. 1, the moving image capture mark 112 resembling the shape of a movie camera is selected. In this case, the moving image capture mode is selected. In this moving image capture mode, the user can notify the digital camera 101 of start or end of the moving image capturing operation every time he or she presses the recording start/stop button 107.

Note that the operation sequence of the digital camera and button layout shown in FIG. 1 are merely an example according to this embodiment, and it is to be understood that arbitrary design may be adopted unless it is related to the gist of the present invention. FIG. 1 does not illustrate, for example, an imaging lens and the like since it shows the rear surface of the digital camera.

Figure 2:
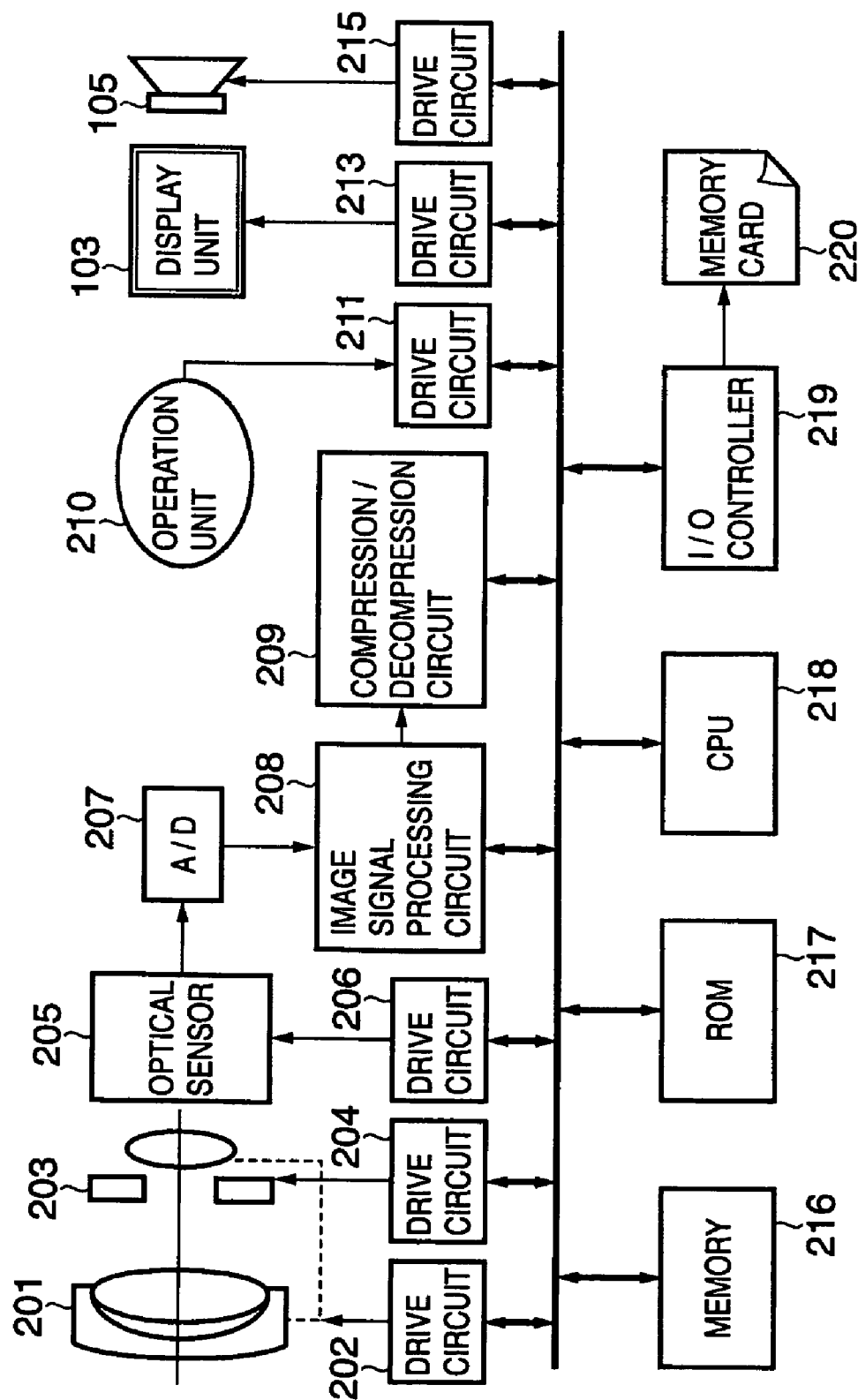
FIG. 2 is a block diagram showing the internal arrangement of the digital camera according to the embodiment of the present invention.

FIG. 2 is a block diagram showing the internal arrangement of the digital camera 101 shown in FIG. 1. The moving image capturing operation will be described below using FIG. 2 as the flow from inputting an optical image to recording an image file.

An image of an object to be captured is formed on an optical sensor 205 via an imaging lens unit 201. The image lens unit 201 has a mechanism for moving a lens group by a motor and the like to, e.g., adjust a focus, and is directly controlled by an imaging lens unit drive circuit 202. At this time, an aperture unit 203 including an aperture is controlled by an aperture unit drive circuit 204 to appropriately adjust the amount of light to be imaged.

The optical sensor 205 comprises a solid-state imaging element (CCD, CMOS, or the like), and has a nature of converting incoming light into electric charges in accordance with an optical amount and accumulating the electric charges. When the electric charges are read out and are converted into a digital signal by an A/D converter 207, a non-compressed digital image is generated.

The optical sensor 205 is appropriately controlled by a pulse signal or the like output from an optical sensor drive circuit 206, and continues to execute a series of operations for reading out accumulated electric charges at designated timings during designated time periods, thus obtaining continuous digital images. The continuous images obtained in this way form a moving image.

In order to compression-encode the continuously obtained digital images, they are passed to an image signal processing circuit 208 to undergo image correction such as white balance correction, gamma correction, and the like, and are then passed to a compression/decompression circuit 209.

Digital images are exchanged among these circuits by accessing a high-speed memory 216 (volatile RAM or the like) using, e.g., a DMA circuit (Direct Memory Access) circuit. By supplying digital image data in the memory 216 to the display unit 103 via a display unit drive circuit 213 during imaging, a captured image can be displayed on the display unit 103 in real time.

The compression/decompression circuit 209 compresses the digital images by a predetermined coding algorithm. For example, in order to generate so-called motion JPEG images by continuous JPEG (see ISO/IEC 10918) coding, the following processing is done. Initially, when a digital image as an input to the image signal processing circuit 208 is an RGB signal, it is converted into a YC signal including a luminance signal component Y and chroma signal components Cb and Cr. The compression/decompression circuit 209 divides the YC signal into 8×8 pixel blocks, applies processing such as discrete cosine transformation, quantization, and Huffman coding to these blocks, and outputs a final compressed image.

Alternatively, when the coding scheme performs interframe prediction such as MPEG-2 (see ISO/IEC 13818), MPEG-4 (see ISO/IEC 14496), and the like, the following processing is done. The compression/decompression circuit 209 applies motion-compensated prediction, macroblock processing, and the like to a specific image (frame) to be compressed with reference to frames before and after that frame, and outputs a compressed image (bitstream) in which frames before and after the frame of interest mutually depend on each other.

The compressed image output in this way is temporarily saved in the memory 216 and is shaped into a file format. After that, the compressed image is output to a storage medium such as a memory card 220 via an I/O controller 219. FIG. 2 uses the memory card 220 as a storage medium. Alternatively, a built-in flash memory, a recordable optical disk such as a DVD-RAM, a magneto-optical disk such as an MO, or the like may be used.

A CPU 218 controls a series of operation described above in real time, and optimizes the processing of respective blocks. The CPU 218 reads out and executes a control program (firmware) stored in a ROM 217 as needed.

In addition, the digital camera 101 has a loudspeaker drive circuit 215 for driving the loudspeaker 105. Although not shown for the sake of simplicity, the digital camera 101 may have, e.g., a microphone as well as the optical sensor 205. An A/D converter for audio data generates a digital signal based on an input signal from the microphone, and an audio signal processing circuit and audio compression/decompression circuit encode the digital signal, thus recording audio data in the same manner as moving image data. A function for such audio data corresponding to the display unit 103 is provided by the loudspeaker 105. An operation unit 210 includes components such as the power switch 102, arrow key 109, and the like which can be operated by the user.

The recording format of a moving image recorded on the memory card 220 of the digital camera 101 will be described below.

Various recording formats of a moving image are available. As for file recording, a format called AVI, a format called ISO Base Media File Format (see ISO/IEC 14496), and the like are popularly used.

In this embodiment, the following description will be given using an MPEG-4 standard file format which is well known as a moving image compression coding format. MPEG-4 standardizes a file configuration as a recording format, and can optimally record moving image data and audio data as a single file. This standardized format is normally called MP4, and has high expandability compatible to various recording formats. In this format called MP4, frames of moving image data and those of audio data are respectively combined into given groups (called "chunks") and the chunks are alternately recorded (called "interleave").

This MP4 is defined as a file format derived from ISO Base Media File Format, and its basic structure is the same as ISO Base Media File Format. In the following description, definition parts common to all file formats derived from ISO Base Media File Format will be explained as MP4 unless otherwise specified.

MP4 is roughly formed of a part that stores a bitstream (to be referred to as "media data" hereinafter) as moving image (including audio) coded data and a part (to be referred to as "header information" hereinafter) that stores various meta data associated with this media data. More specifically, MP4 is formed of two parts, i.e., media data and header information in the most basic format.

Figure 3:
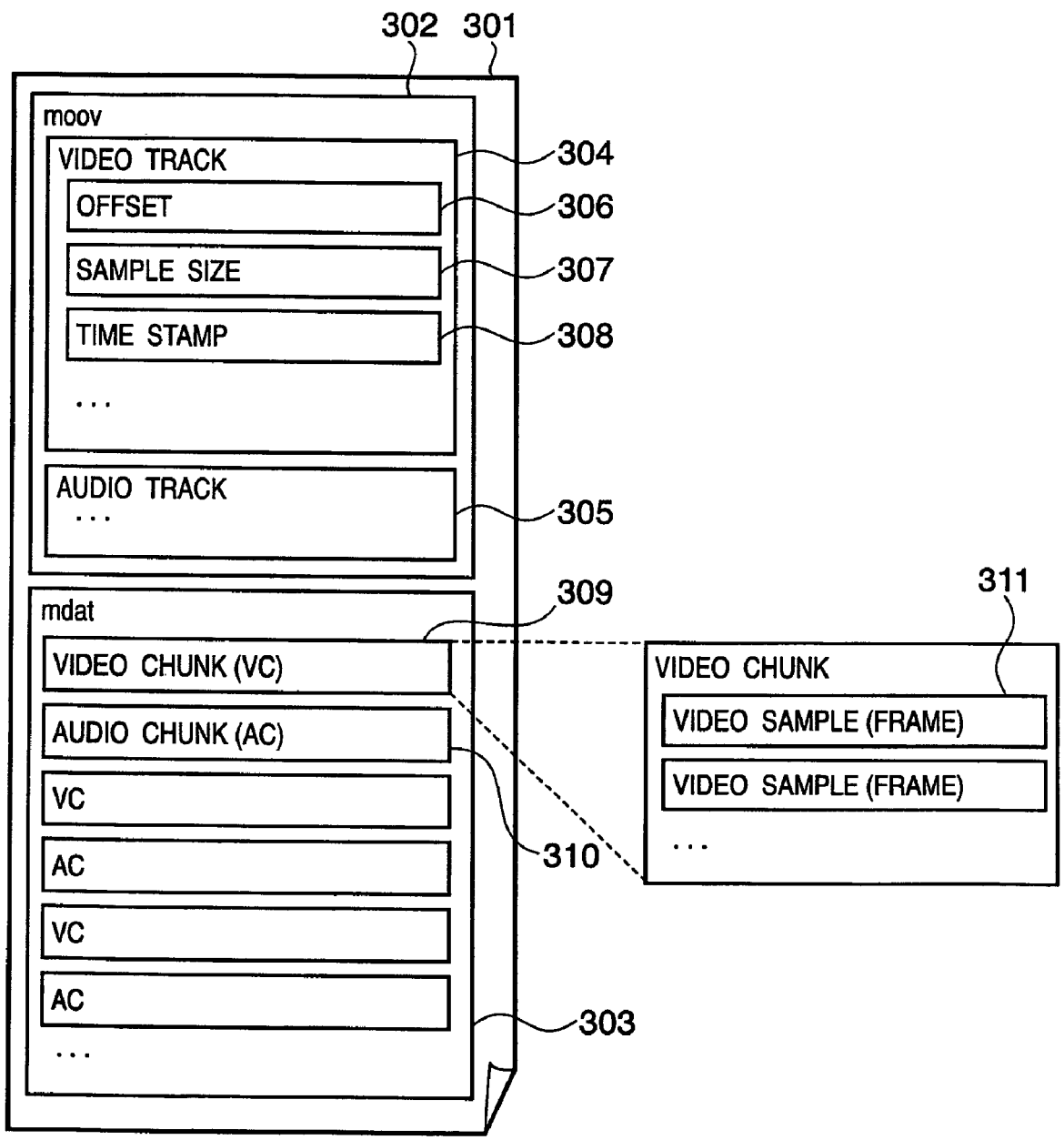
FIG. 3 depicts a view showing a basic file format of MP4.

FIG. 3 shows this basic file format of MP4. As described above, an MP4 file 301 includes header information 302 and media data 303.

The header information 302 typically includes a video track 304 which logically handles the entire moving image data, and an audio track 305 which logically handles the entire audio data. The video track 304 and audio track 305 have substantially the same basic configuration. That is, each track has various meta data corresponding to actual media data, and slightly has different contents depending on the property (moving image or audio) of media data.

The video track 304 includes configuration information of a so-called decoder required to decode coded data, information such as the rectangle size of moving image data, and the like. Also, the video track 304 includes an offset 306 indicating the location on a file where the media data is actually recorded, and a sample size 307 indicating the size of each individual frame data (also called "picture") of the media data. Furthermore, the video track 304 includes a time stamp 308 indicating a decode time period of each individual frame data and the like.

The media data 303 records entities of moving image data and audio data as units called chunks. These chunks include video chunks 309 including moving image media data and audio chunks 310 including audio data in accordance with the tracks in the header information 302.

In the configuration shown in FIG. 3, the video chunks 309 and audio chunks 310 are alternately recorded. However, the recording locations and order of these chunks need not always be those shown in FIG. 3. This example is merely an example of a generally recorded file format. However, such alternate allocation (interleave) is very popularly used. This is because moving image and audio data which are to be played back at nearly the same times are allocated at close locations to improve accessibility of data recorded in a file.

Each chunk includes one or more samples (decode unit) of individual media data. For example, as shown in FIG. 3, in the video chunks 309, video samples (frames) 311 are continuously recorded. In general, this video sample (frame) 311 corresponds to one frame data (picture) of moving image data.

The video track 304 and individual video chunks 309 are associated with each other as follows. Information included in the video track 304 includes those associated with the video chunks 309 included in the media data 303.

The offset 306 includes a table of information indicating the relative locations of the video chunks on the file. By referring to individual entries of the table, the locations of the video chucks can be detected independently of their recording locations on the storage medium.

The sample size 307 includes a table of information indicating sizes of plural samples included in the individual video chunks 309, i.e., respective video samples (frames) 311. More specifically, information that records the number of video samples (frames) 311 included in individual video chunks 309 is also recorded in the video track 304. The video samples (frames) 311 included in individual video chunks 309 can be accurately obtained on the basis of these pieces of information.

The time stamp 308 records the decode time period of each individual video sample (frame) 311 as a difference between neighboring video samples (frames) 311 in a table. By accumulating the decode time periods of the respective video samples (frames) 311 with reference to this table, a relative period of the target video sample (frame) 311 can be obtained.

Such relationship between the video track 304 and video chucks 309 is defined to similarly apply to that between the audio track 305 and audio chunks 310.

In this manner, in the MP4 file, coded data can be obtained in required units and from arbitrary locations based on the header information 302 and media data 303 together with additional information such as the time stamp data and the like.

Note that not all pieces of standardized recorded information are described for the sake of simplicity. Details of the standardized definition contents can be recognized by referring to corresponding parts of ISO/IEC 14496.

The flow of the operations of the digital camera 101 and user in the first embodiment will be described below with reference to FIG. 4.

Assume that the digital camera 101 can record moving image (including audio) data by MPEG-4, its recording format is MP4, and one or more existing MP4 files are recorded in the memory card 220. In the following description, these MP4 files will be referred to as "recorded MP4 files". Step S401 as an initial state corresponds to such state. Note that the following operations are controlled by the CPU 218 unless otherwise specified.

In step S402, the digital camera 101 detects a user's instruction operation 451 via an operation unit drive circuit 211. Upon detection of the user's instruction operation 451, the flow advances to step S403.

In step S403, the digital camera 101 checks the contents of the user's instruction. If the recording start/stop button 107 is pressed, i.e., a recording start instruction is input, the flow advances to step S405; if another instruction is input, processing corresponding to that instruction is executed in step S404. Since the processing in step S404 is not the gist of the present invention, a detailed description thereof will be omitted.

In step S405, the digital camera 101 searches a recorded MP4 file. It is determined in step S406 whether the recorded MP4 file exists or not. In this embodiment, the following explanation will be given under the condition that the recorded MP4 file exists. However, if such file does not exist, a new MP4 file is generated in step S407. In this case, by handling the new MP4 file to be equivalent to an MP4 file 453 to be described later (recorded MP4 file), processing can be commonized to that in case of additional recording. That is, since the recording processing itself can be similarly done independently of the presence/absence of recorded MP4 files, the arrangement of the digital camera 101 can be simplified.

If the recorded MP4 file exists in the step S406, the digital camera 101 stores a last frame location 452 of this recorded MP4 file in step S408. The location 452 may be stored in the memory 216 on the digital camera 101, or a temporary file or the MP4 file on the memory card 220. Details of the last frame location 452 will be described again later.

In step S409, imaging and image coding processing are done. In step S410, a coded image is added to the recorded MP4 file 453. This processing is continued until a recording end instruction is detected upon depression of the recording start/stop button 107. The image coding processing is done, as described above using FIG. 2.

In step S411, the digital camera 101 detects a user's instruction operation 454 via the operation unit drive circuit 211. Upon detection of the user's instruction operation 454, the flow advances to step S412; otherwise, the flow returns to step S409 to continue imaging processing (to capture, encode, and add an image).

In step S412, the digital camera 101 checks the user's instruction contents. If the recording start/stop button 107 is pressed, i.e., a recording stop instruction is input, the flow advances to step S413. If another instruction is input, processing corresponding to that instruction is executed in step S414, and the flow then returns to step S409 to repeat the imaging processing. Since the processing in step S414 is not the gist of the present invention, a detailed description thereof will be omitted.

The digital camera 101 checks in step S413 again based on the detection result of the recorded MP4 file in step S405 if an image is being added to that recorded MP4 file. In case of new recording, the processing ends. If a coded image is being added to the recorded MP4 file, the flow advances to step S415.

In step S415, the digital camera 101 prompts the user to determine whether to record the additionally recorded MP4 file as an MP4 file in the added state or to separate the added part of the file to generate a new file. The digital camera 101 displays a user interface for this purpose on the display unit 103. The digital camera 101 checks in step S415 if the separation is selected. If it is selected that the file is not separated, the processing ends. On the other hand, if it is selected that the file is to be separated, the separation processing of the MP4 file is executed in step S417, thus ending the processing.

With the aforementioned processing, the digital camera 101 can prompt the user to determine whether to settle adding of the file or to separate the added part so as to record it as a new file after completion of imaging.

In this flowchart, the existence of the recorded MP4 file is checked in two steps, i.e., steps S406 and S413. However, the checking processing in, e.g., step S413 may be done using the presence/absence of recording of the last frame location 452 or its value, or the order of processes may be partially changed for the sake of optimization. This flowchart shows one of possible examples, and upon implementation in an actual imaging device, the processing may be defined to include plural tasks which are processed parallelly so as to distribute the processing load. Hence, various improvements may be made.

The image addition processing (step S410) will be described in more detail below using FIG. 5. The header information 302 and media data 303 have already been recorded in the recorded MP4 file to generate a single complete MP4 file.

When coded data is to be added to this file, media data as entities of moving image data and audio data need only be recorded sequentially for respective chunks, as has already been described above using FIG. 3. More specifically, new chunks to be recorded are added after the already recorded video chunks 309 and audio chunks 310.

Figure 5:
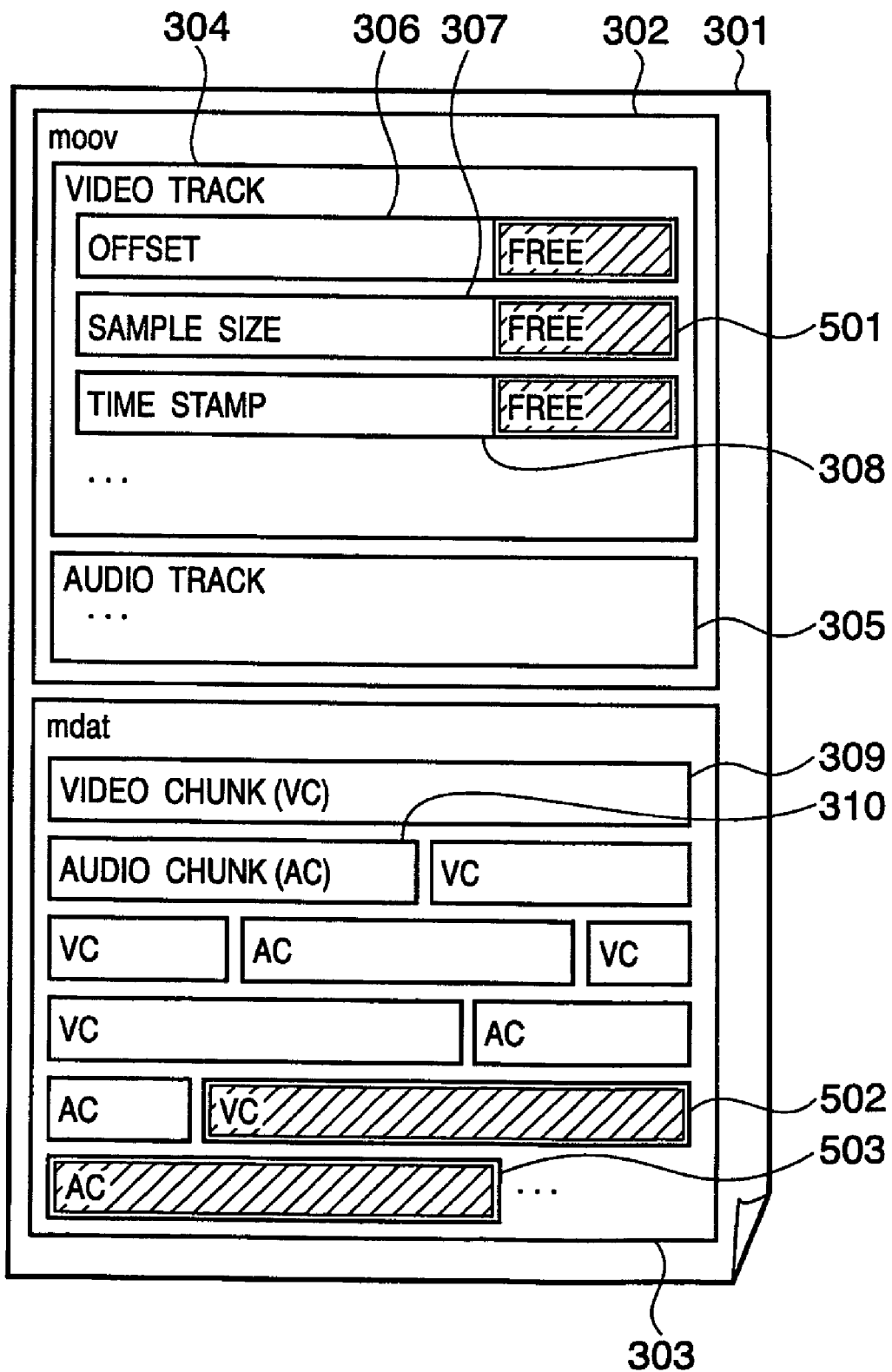
FIG. 5 depicts a view showing add processing to an MP4 file.

A hatched VC 502 and AC 503 bounded by double frames shown in FIG. 5 are respectively a newly added video chunk and audio chunk. In terms of the standard of MP4, the VC 502 and AC 503 are equivalent to the video chunk 309 and audio chunk 310, respectively. Such chunks can be easily added to the end of the already recorded file.

In MP4, the locations of the header information 302 and media data 303 can be reversed, and the header information 302 can be allocated after the media data 303. Even in such case, addition to the end of the already recorded file can be done without any problem. It is defined that an identifier called "mdat" indicating the media data 303 is recorded in an area corresponding to the media data 303, and plural areas of media data including this identifier can be held. Hence, after the media data 303 and header information 302, the second media data 303 can be allocated. Alternatively, a free space which is not normally used may be prepared in advance between the media data 303 and header information 302, and chunks may be overwritten and added into this free space.

Various methods associated with such physical allocations of data may be used, and arbitrary methods may be used.

A method of changing information such as the offset 306 and the like recorded in the header information 302 will be described below. Note that "change" indicates both to alter an already recorded value to another value and to add a new value.

The offset 306 records information indicating the locations of individual chunks on the file as a table. For this reason, processing for adding information indicating the location of an added chunk on the file, i.e., adding the offset for the added chunk to the table, is executed. One of recording formats of this offset 306 is defined as follows.

```
aligned(8) class ChunkOffsetBox
    extends FullBox('stco', version = 0, 0) {
    unsigned int(32) entry_count;
    for (i=1; i ≦ entry_count; i++) {
        unsigned int(32) chunk_offset;
    }
}
```

Therefore, "entry_count" is incremented as many as the number of added chunks such that "entry_count" designates the final number of chunks. In addition, a table area of "chunk_offset" is broadened in correspondence with the number of added chunks, and offsets of the added chunks are recorded there.

As the offset recording format, a ChunkLargeOffsetBox class which uses a 64-bit area in place of 32-bit "chunk_offset" is also defined, but the same processing contents are applied. These formats are selected in accordance with that of the recorded MP4 file.

When the table size increases by adding chunks, overflow may occur with respect to the recorded area of the recorded MP4 file. For example, if "entry_count" is 4, since four "chunk_offset"s are recorded (16 bytes), they form a 20-byte area together with 4 bytes of entry_count. If only one chuck is added to this area, the number of "chunk_offset"s is five, and 24 bytes are required as a whole. Hence, a 4-byte area overflows.

Such overflow problem can be solved by two methods. In the first method, a free space is created behind the offset 306, and information is recorded there. A hatched free space 501 bounded by a double frame shown in FIG. 5 corresponds to this space.

In the second method, information is re-allocated using a recording unit called BOX (or Atom). For example, if a free space is prepared in advance between the header information 302 and media data 303, the allocations of the entire information included in the header information 302 are re-distributed to solve the overflow problem.

Even when no free space is prepared in advance, a chunk which neighbors the header information 302 may be re-allocated at the end of the file, and an area that becomes empty may be assigned to the free space. Since the locations of chunks are recorded in the offset 306, only the offset information of the re-allocated chunk is rewritten, thus maintaining the proper format of the MP4 file.

As for the sample size 307, the same processing as in the offset 306 can be applied. The sample size 307 records the sizes of individual frames (samples) included in the chunks, and the table can be expanded in the same manner as in the offset 306.

Substantially the same processing can also be applied to the time stamp 308, except for one point. This point will be described below.

The table recorded in the time stamp 308 uses run-length compression algorithms. That is, information that gives the time stamp of each frame is recorded in this table as a time difference between frames. If these differences are the same value and continuously appear, the table size can be compressed by recording their run-length and the difference values.

However, in a format of indefinite time stamp intervals called a variable frame rate, since difference values are different for respective frames included in the chunks to be added, the table recorded in the time stamp 308 must be expanded in correspondence with the number of frames, and must be added. In such case, the same processing as in the offset 306 and the like is done.

On the other hand, in case of a fixed frame rate, if the frame rate of media data to be added is the same as that of the recorded MP4 file, the difference values of time stamps become equal to each other. For this reason, the table need not be expanded, and processing can be completed by changing only the number of difference values to the number of frames that are finally recorded.

Note that various other kinds of information should be recorded in the header information 302 in terms of the MP4 standard. These kinds of information include those which are indispensable, and those which should be selectively recorded. These pieces of information which are included in the recorded MP4 file and are related ones upon adding media data must undergo table expansion and the like in the same manner as in the information described so far.

These pieces of non-described information include various kinds of information such as information indicating in which chunk a sample is included, information indicating a sample that allows random access, information that gives a time stamp upon playback, and the like. Also, some pieces of information have a definition that can selectively use plural formats. However, since these pieces of information are not always necessary in this embodiment, a detailed description thereof will be omitted.

Display of the user interface of separation instruction (step S415) will be described in more detail below using FIG. 6. The user is provided with an opportunity of selecting one from two recording formats using the user interface shown in FIG. 6 irrespective of internal processing to be executed in the digital camera 101. That is, the user can select whether to record the recorded video data while it is added to the already recorded MP4 file as one file or to separate the recorded video from the already recorded MP4 file and to record it as a new file, after stop of video recording.

A field 601 displays "video recording option" indicates a title of this user interface, and an image 602 of captured moving image data is displayed on the entire background. By a field 603 which is displayed to be overlaid on this display and reads "add?", the user can recognize that he or she is currently given an opportunity of selecting whether to record data intact or to record data after separation.

A field 604 reading "add" and a field 605 reading "separation" are selectable by a user's operation. FIG. 6 indicates that "add" is selected by a hatched field (highlighted field) bounded by a double frame.

Selection of these fields is implemented to be changed by, e.g., operating the arrow key 109 of the digital camera 101 to press its down key. The user selects desired processing, i.e., "add" or "separation" by the arrow key 109, and then presses the enter button 110, thus notifying the digital camera 101 of the selection result.

In this example, processing is done by the operation of a so-called GUI (graphical user interface) by means of the arrow key 109 and that of the enter button 110. As the operation method, various methods may be adopted. For example, even when the same GUI is used, the same processing as that upon depression of the enter button 110 may be made by pressing a right key of the arrow key 109 in place of the enter button 110. Also, a guidance message by means of a voice, LED, or the like may be used to prompt the user to select whether or not to separate data without using any GUI.

Figure 13:
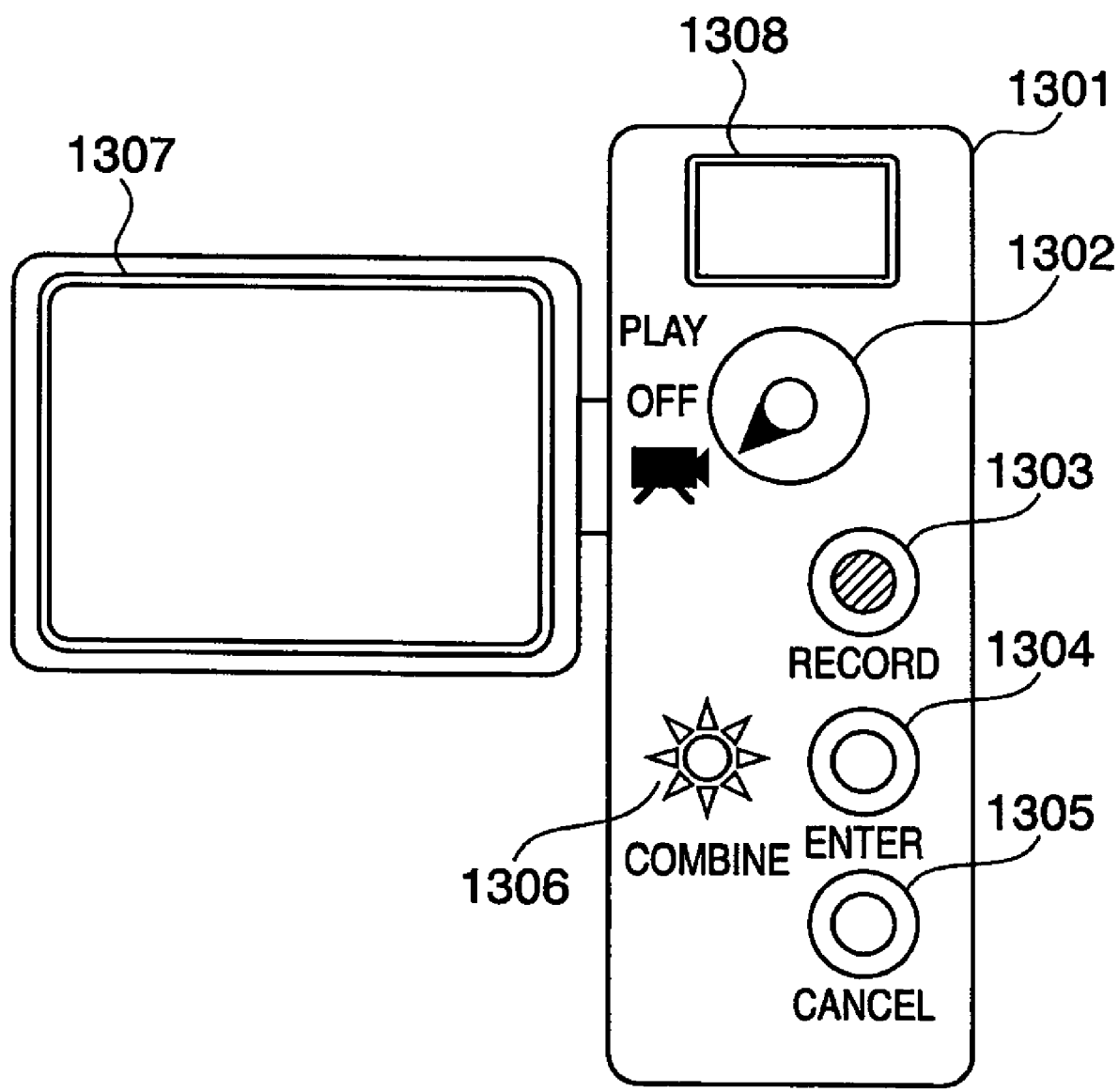
FIG. 13 depicts a view showing a modification of a digital camera according to the embodiment of the present invention.

FIG. 13 shows an example when no GUI is used. The arrangement of a digital camera 1301 is substantially the same as that of the digital camera 101, and the point is an addition indicator 1306. An LED is embedded in the addition indicator 1306. When this LED is lighted or blinking, whether to record the recorded video data as an added MP4 file to which that data is added to the already recorded MP4 file, or to separate the added MP4 file from the original MP4 file and to create a new file and to record the recorded video data as the new file can be selected.

The file separation processing (step S417) will be described in more detail below.

If it is determined in step S416 that the added data is separated from the original MP4 file, the file separation processing is executed (step S417). In this step, processing for separating an added file, i.e., a file to which data is added and combined (to be referred to as a combined MP4 file herein-after), from an original MP4 file and creating a new MP4 file is executed. With this processing, the user can recognize these files as different MP4 files recorded on the memory card 220 or the like of the digital camera 101.

In the file separation processing (step S417), added data of the combined MP4 file must be determined, and the combined MP4 file must be divided into the originally recorded data and the added data. As information used to divide the combined MP4 file into originally recorded data and the added data, the last frame location 452 stored in the last frame location storage step (step S408) can be used.

As described above, the last frame location 452 may be stored in the memory 216 on the digital camera 101 or in a temporary file or the recorded MP4 file on the memory card 220.

A case of the memory 216 or temporary file will be explained first. The memory 216 and temporary file can be similarly handled although they have different storage modes upon implementation.

When the combined MP4 file is to be divided, processing opposite to that explained in the file addition processing (step S410) is executed. That is, the media data 303 is separated, and information included in the header information 302 is also separated.

Figure 7:
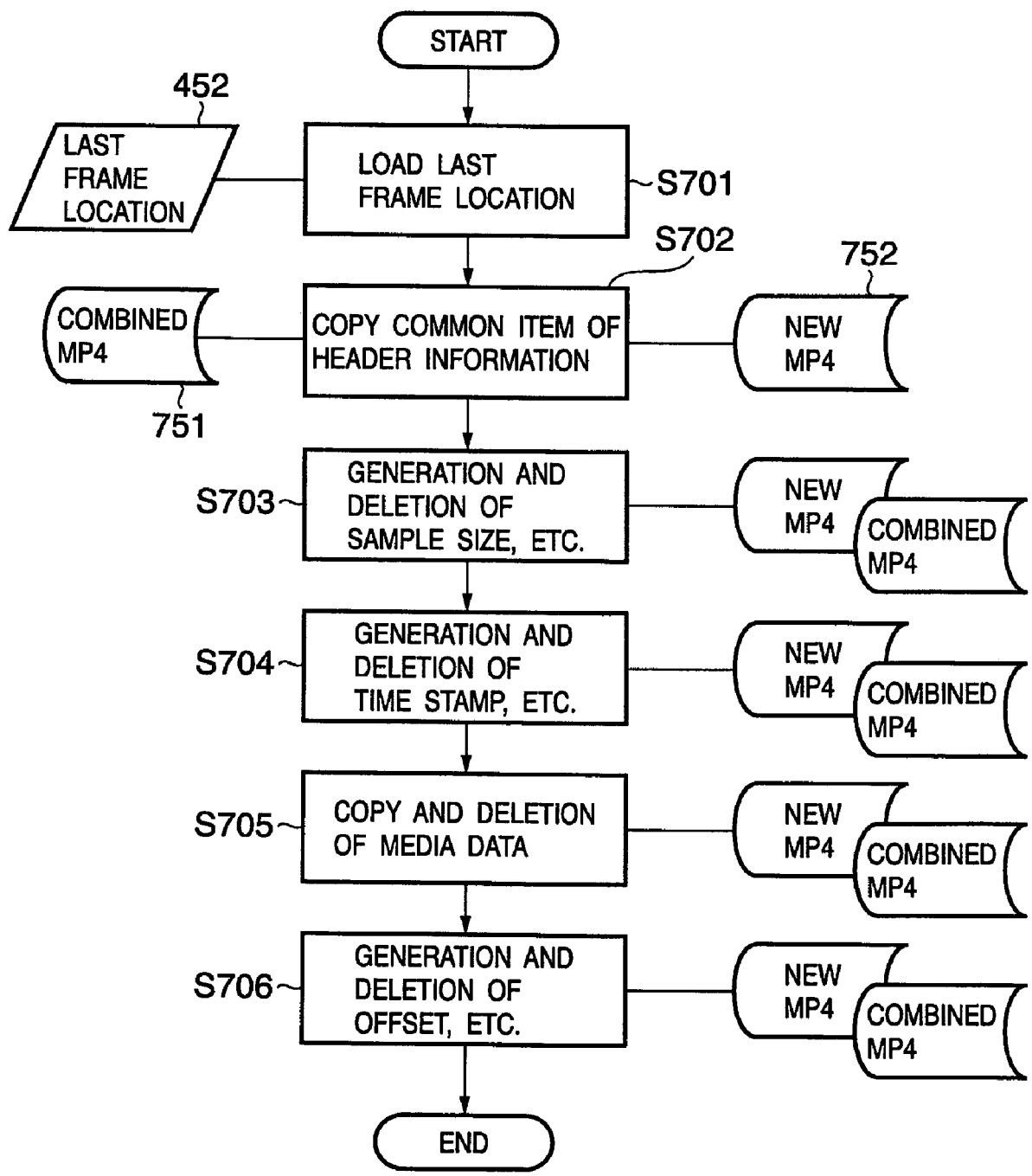
FIG. 7 is a flowchart showing processing for separating an MP4 file.

FIG. 7 is a flowchart showing the separation processing of an MP4 file.

In step S701, the digital camera 101 loads the last frame location 452. The contents of information included in this last frame location 452 will be described in turn later.

In step S702, the digital camera 101 loads a combined MP4 file 751, and generates a new MP4 file 752 based on information of the file 751. Note that the new MP4 file is not a complete MP4 file but a file including only a common part which forms the MP4 file. Such common part includes, e.g., time scale data common to all multimedia data stored in the MP4 file, MovieHeaderBox as meta data including information such as a date of creation and the like, and so forth.

In step S703, the digital camera 101 obtains the order of the adding start frame from the first frame on the basis of the information stored as the last frame location 452. The digital camera 101 records a table of the sample size 307 in the new MP4 file 752, and deletes added data from the table of the sample size 307 of the combined MP4 file 751 on the basis of the obtained order.

Note that the sample size 307 is defined in the standard as follows.

```
aligned(8) class SampleSizeBox extends FullBox('stsz',
version = 0, 0) {
        unsigned int(32) sample_size;
        unsigned int(32) sample_count;
        if (sample_size==0) {
            for (i=1; i ≦ sample_count; i++) {
                unsigned int(32) entry_size;
            }
        }
}
```

With this definition, the table of the sample size 307 is made up of "sample_count" that gives the number of samples, and "entry_size" as the number of sample values. Therefore, more specifically, a value obtained by subtracting the order (value) of the adding start frame from the first frame from the original "sample_count" of the combined MP4 file 751 is set as "sample_count" of the new MP4 file 752. Then, every "entry_size" data after the location corresponding to the adding start frame is stored in the table of sample size of the new MP4 file 752. Also, "sample_count" of the combined MP4 file 751 is changed to a value obtained by subtracting 1 from the order of the adding start frame from the first frame, and "entry_size" data after that value are deleted while leaving "entry_size" data from the first frame to that value.

Note that slightly different processing is done when "sample_size" that stores a default value of the sample size is used (when "sample_size"≠0). In this case, since this means that all sample sizes have an equal value, the sample size 307 of the new MP4 file 752 can be duplicate of the sample size 307 of the combined MP4 file 751.

Note that the video track 304 and audio track 305 must be copied from the combined MP4 file 751 to the new MP4 file 752 prior to processing of information such as the sample size 307 and the like in the tracks. However, since this is not the essential point of the present invention but is an issue related to the standard, a detailed description thereof will be omitted.

In step S704, the digital camera 101 executes processing associated with generation, deletion, and the like of the time stamp 308. In this case as well, processing for generating the time stamp 308 of the new MP4 file 752 is performed based on the recording contents of the combined MP4 file 751, and deleting an unnecessary table part from the combined MP4 file 751 is executed.

In the detailed description of the file addition processing (step S410), recording based on the run-length compression algorithms has been explained. Likewise, in case of a fixed frame rate, the number of difference values need only be changed to the number of recorded frames. The number of frames can be calculated by the same method as that which has already been described in association with generation, deletion, and the like of the sample size 307 in step S703. In case of a variable frame rate, the values in the table must be separated in the same manner as in the sample size 307 to change that table to an appropriate one.

Note that the processing of the time stamp 308 can be done as long as only the order of the adding start frame from the first frame is recognized. That is, the information included in the last frame location 452 need only store the order of the adding start frame from the first frame.

Of course, in order to speed up the processing, it is effective to store the adding location of the run-length compressed time stamp 308 on the table in the last frame location 452. For example, by storing what number of an entry is the adding location in the information included in the last frame location 452, the adding location on the table can be easily detected.

In step S705, the media data is copied and deleted. This processing moves the added media data included in the combined MP4 file 751 to the new MP4 file 752.

Upon executing this processing, since actual media data is recorded for respective chunks, the location of each chunk must be detected. The location can be detected from the sample location using information in an indispensable area called SampleToChunkBox. More specifically, a target chunk location can be detected from the order of the adding start frame from the first frame. Actual processing for moving the chunks can be done from this chunk location. Of course, in order to speed up processing, the relative location and size of the added media data on the file may be separately stored and used.

Note that generation of information associated with the area of SampleToChunkBox and the like can be done simultaneously with this processing. Also, information indicating a sample that allows random access and the like can also be generated in this processing. A detailed description of processing of such some pieces of information is omitted in the same manner as in the detailed description associated with the file addition processing (step S410) using FIG. 5.

Finally, in step S706 processing for generating and deleting the offset and the like is executed. In correspondence with the chunks deleted (moved) from the combined MP4 file 751 as a result of copy and deletion of the media data in step S705, the table stored in the offset 306 is changed to the one from which data corresponding to the deleted chunks are removed. On the other hand, since new chunks are copied to the new MP4 file 752, the offset 306 corresponding to them is generated. At this time, note that the table to be generated is not a partial copy from the offset 306 of the combined MP4 file 751 but a new one based on the copied chunks. This is because the offset locations of the copied chunks on the file are different on the new file.

The file separation processing is executed in this way. A further explanation will be given in association with BOX consistency and the free space. For example, information such as the offset 306 and the like is recorded in units called BOX or Atom in MP4. At the beginning of this BOX, an area indicating the size of BOX itself is assured. When the table size has changed, the value of the area indicating the size of BOX itself must be changed to a correct value. An area which is not included in BOX as a result of the aforementioned processing must be changed to the aforementioned free space or the like.

A case will be explained below wherein the last frame location 452 is recorded on the recorded MP4 file.

The location 452 of the last frame gives the last recording location of the recorded MP4 file. For this reason, by giving additional information onto the file at the finally generated timing of the recorded MP4 file, the last frame location 452 can be stored in step S408.

As a method of recording the last frame location 452 in the recorded MP4 file, a user data area (UserDataBox) which can be arbitrarily used by the user can be used. The user data area is defined as follows.

```
aligned(8) class UserDataBox extends Box('udta') {
}
        More specifically, the user data area can store
arbitrary data in practice.
        When, for example, the following data format is
added using this area, the last frame location 452 can
be recorded in the MP4 file.
aligned(8) class UserLastFrameBox extends
FullBox('ulfr', 0, 0) {
        unsigned int(32) last_sample;
}
```

Note that UserLastFrameBox is a class which defines an area that records the last frame location 452, and "last_sample" is the order of a frame immediately before the adding start frame, i.e., the location of the last frame.

The value indicating this location is information which can be easily obtained from the recorded MP4 file without using such recording. However, once addition processing starts, since the header information is changed, it becomes difficult to detect the original location from the added MP4 file. For this reason, by separately recording information, this problem can be avoided.

When the header information of the file is not immediately changed but it is updated after completion of write access of the media data in implementation that executes addition processing, storage of the last frame location 452 is not always indispensable. However, even in such case, processing corresponding to storage of the location where the addition processing is to be executed takes place by an arbitrary method during the processing.

Selection of the recorded MP4 file, i.e., an object to which data is to be added, will be described below.

If there are plural recorded MP4 files, a file used as an object to which data is to be added as the recorded MP4 file must be determined. As such determination means, plural means are available.

For example, in the same manner as means used in file selection or the like upon editing, the following method may be used. That is, existing captured files are displayed as a list using thumbnails and the like, and are visually selectable using the arrow key 109, enter button 110, and the like. Then, the selected file name is stored. When the selected file is used as the recorded MP4 file 453, data can be added to an arbitrary file. Also, the latest file may be determined as the recorded MP4 file.

Upon capturing a moving image, the same processing parameters of the coding method used in the recorded MP4 file, the same rectangle size of a moving image, and the like must be used.

In the description of this embodiment, the user makes selection as to whether or not to separate a file after completion of imaging. Allowing selection after completion of imaging is one of merits of this embodiment, but it need not be limited to a timing after completion of imaging. That is, an interface used to determine whether or not to separate a file as needed even before or during imaging may be provided.

Finally, the file format in this embodiment will be additionally explained.

The MP4 file explained so far has a general file format including one header information 302 and media data 303. Such format of an MP4 file (or ISO Base Media File) is most prevalent now.

However, in recent years, in consideration of lightweight processing of the header information 302 or the like, a file of a format called fragmented header (Fragmented Movie or Movie Fragment Header) is becoming also prevalent. In this format, based on the file configuration shown in FIG. 3, a header can be partially fragmented and postposed.

When the fragmented header is used, combinations of fragmented header information similar to the header information 302 and corresponding media data can be continuously allocated after the header information 302 and media data 303. That is, by postposing data to be added as fragmented header information and media data, the file separation processing (step S416) can be executed more easily.

In addition to the MP4 file, various other recording formats of a moving image are available. For example, the present invention can be applied to a format called an AVI file, a format called ASF, and a format called MOV.

For example, in case of an AVI file, chunks in MP4 are recorded in an area called LISTmovi, and meta data such as the data types of these chunks, offsets, and the like are recorded in an area called IDXl. These areas are stored in a nested pattern together with the area sizes as in MP4. Except for the different allocation and format of information to be stored of such file, the same processing as in MP4 can be logically done.

Note that the digital camera 101 of this embodiment includes a digital still camera and digital video camera, as described above. In addition, the present invention can be applied to a video recorder having a separate imaging system. Also, the present invention can be applied to general-purpose devices such as a portable computer called a PDA and the like as long as the constituent elements of the present invention are satisfied.

As described above, according to this embodiment, in a case where a recorded MP4 file exists on the memory card 220 of the digital camera 101, a newly captured image is automatically added to the recorded MP4 file to generate a combined MP4 file. After that, the digital camera 101 provides the user interface which allows the user to select whether or not to separate the added image file from the combined MP4 file after completion of imaging. When the user selects to separate the file, the combined MP4 file is divided into the original recorded MP4 file and a new MP4 file.

In this way, the user need not determine whether or not to add an image to an existing file before imaging, and can determine whether or not to add the image (in other words, whether or not to separate the file) after completion of imaging.

Second Embodiment

In the description of the first embodiment, the user directly determines whether or not to separate the added file (image) from the combined MP4 file. In the second embodiment, a modification of the determination method (to be referred to as "operation mode" hereinafter) (the condition upon separation of a file is determined in advance, and so forth) will be described.

In this embodiment, since the arrangement of the digital camera 101 and the configuration of the MP4 file 301 can be the same as those in the first embodiment, a description thereof will be omitted.

The operation mode to be explained in this embodiment is disposed to complement the basic processing operations described so far, and the present invention can be used more effectively by setting this operation mode.

Three operation modes to be described below respectively automate the processing after display of the user interface in step S415 shown in FIG. 4.

The first operation mode is an auto separation mode based on an addition time period or size. In this operation mode, the threshold of a time period or size of data to be added is set in advance, and separation processing is automatically executed in correspondence with a case wherein the actual time period or size exceeds this threshold or a case wherein the time period or size is less than the threshold. That is, the digital camera 101 operates under the assumption that it is determined in step S416 that the user selects separation.

Figure 8:
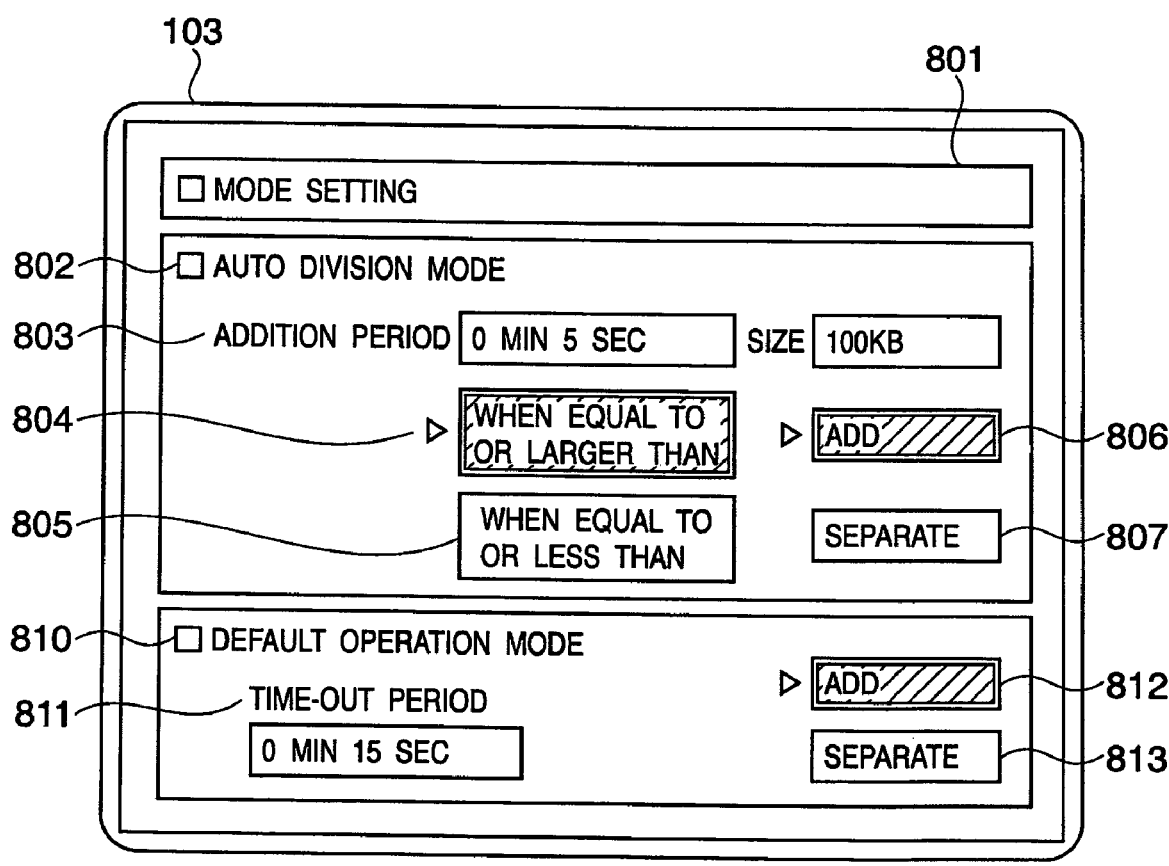
FIG. 8 shows an example of an operation mode setting window according to the embodiment of the present invention.

FIG. 8 shows an example of an operation mode setting window displayed on the display unit 103. The window has a field 801 reading "mode setting", thus notifying the user of the mode setting window. A field 802 displays "auto division mode" corresponds to the setting contents of the auto separation mode based on the addition time period, and the setting contents are displayed within the frame of this field.

In fields 803 reading "addition period" and "size", values of 5 sec and 100 KB in FIG. 8 are shown as thresholds set in advance. The user can change the values of these thresholds using the arrow key 109 and the like.

In a field 804 reading "when equal to or larger than" and a field 806 reading "add", which are highlighted by hatched double frames, and a field 805 reading "when equal to or less than" and a field 807 reading "separate", the following operation is set. That is, the operation for adding (i.e., not to separate) or separating a file in a case where its addition time period or size is equal to or larger than or when it is equal to or less than the threshold is set.

With these combinations, in this example, in a case where the addition time period is 5 sec or more or the size is 100 KB or more, it can be designated not to automatically separate a file.

The conditional checking processing based on such operation mode can be easily implemented by modifying those in steps S415 and S416.

In this way, for example, when the adding operation is made for a predetermined time period or less (e.g., several seconds), it is determined that the imaging operation is canceled immediately due to a miscue of a camera operation or the like, and a miss shot image can be automatically separated without being recorded as the combined MP4 file. On the other hand, when data relatively as large as 5 MB is added, it can be set to separate the file so as to facilitate file handling in, e.g., e-mail or the like.

Note that the relationship between the addition time period and size may have an AND condition, or an OR condition (not shown). That is, the set processing (e.g., separate a file) may be executed in a case where both the conditions are met or when either one condition is met.

The second operation mode is a default-operation mode which sets a time-out period of user interface display in step S415 and sets processing contents in case of time-out. In this operation mode, a time-out period of the decision and a default operation are set using GUI displayed on the display unit 103 shown in, e.g., FIG. 6, and when no decision is made during a predetermined period of time, adding or separation processing can be automatically executed corresponding to the default operation.

FIG. 8 also shows an example of this setting method. Items in a field 810 reading "default-operation mode" correspond to the setting contents of this mode.

In a field 811 reading "time-out period", a time-out period is set. The user sets an arbitrary time-out period in this field. In a field 812 reading "add" which is highlighted by a hatched double frame and a field 813 reading "separation", processing to be executed after an elapse of the time-out period is set.

The conditional checking processing based on this operation mode can also be easily implemented by modifying those in steps S415 and S416. After the user interface for instructing separation of file is displayed on the display unit 103 in step S415, the control waits until the time-out period elapses. After an elapse of the set time-out period, the processing can be executed under the assumption that the user selects either operation.

Figure 6:
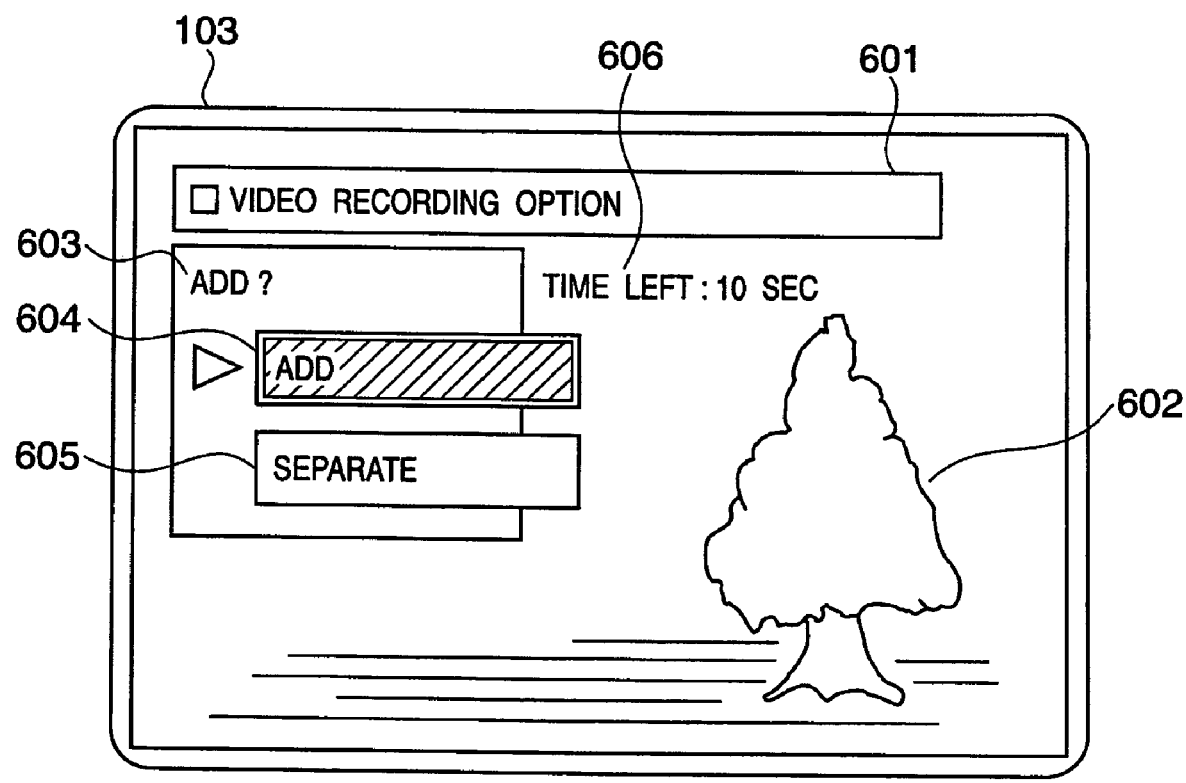
FIG. 6 shows a display example of a separation instruction user interface.

In the example of FIG. 8, after the user interface shown in FIG. 6 is displayed on the display unit 103 for 15 sec, the operation is made under the assumption that it is designated not to separate a file.

At this time, by notifying the user of the remaining time period until time-out like text 606 "time left: 10 sec" shown in FIG. 6, user's convenience can be improved.

The third operation mode is an updated date judgment mode which checks based on the updated date and time of the recorded MP4 file whether or not to execute the separation processing. In this operation mode, only when the last updated date and time of the recorded MP4 file are newer than a pre-set date and time, it can be set to automatically separate or not to separate a file.

Although this setting example is not illustrated, it is the same as in the first and second operation modes.

The conditional checking processing based on this operation mode can also be easily implemented by modifying those in steps S415 and S416. Alternatively, this checking processing may be done in advance in the step of detecting the recorded MP4 file (step S405).

Note that an addition inhibition mode as an operation mode for inhibiting most of operations of the present invention may be set. In this operation mode, a captured image is recorded in a new MP4 file, and can be handled in the same manner as in the conventional digital camera.

As described above, according to this embodiment, the digital camera 101 determines whether or not to separate a file in accordance with a predetermined condition. In other words, when the predetermined condition is satisfied, the digital camera 101 issues a separation instruction in place of the user.

In this way, the user need not determine whether or not to separate a file every time he or she captures an image, thus obviating the need for deciding to separate a file after imaging.

Third Embodiment

In the description of the first embodiment, a new moving image is added immediately after the end of the recorded MP4 file. However, as in editing of a moving image on, e.g., a PC, it may be requested to combine two moving image files to overlap each other, i.e., to add a new moving image to be overwritten on a part of the recorded MP4 file. The third embodiment will explain this case.

In this embodiment, since the arrangement of the digital camera 101 and the configuration of the MP4 file 301 can be the same as those in the first embodiment, a description thereof will be omitted.

FIGS. 9A to 9D depict conceptual views of such overwriting addition processing. In FIG. 9A, a recorded MP4 file is expressed by six frames of images. In FIG. 9B, a moving image to be added is expressed by five frames of images. FIG. 9C shows a combined MP4 file by simple addition according to the first embodiment. In FIG. 9C, the combined MP4 file is expressed by a moving image of a total of 11 frames which include those in FIGS. 9A and 9B. FIG. 9D shows an overwritten and added MP4 file, in which the fifth and sixth frames in FIG. 9A are overwritten by those in FIG. 9B that shows the moving image to be added.

The method of setting an overwriting format upon addition, as shown in FIG. 9D, will be described in more detail below. This embodiment is different from the first embodiment in determination of an overwrite location and file separation processing.

Determination of an overwrite location will be described first. Determination of an overwrite location is implemented by designating it in advance in the recorded MP4 file or designating it on an interface (step S415) provided after completion of imaging.

The method of designating the overwrite location in the recorded MP4 file in advance can be achieved by the storage processing of the last frame location 452 of the MP4 file described in the first embodiment. As described above, the last frame location 452 may be recorded by an arbitrary method. However, in a case where the overwrite location is recorded in the recorded MP4 file, it must be designated before the beginning of imaging. In this case, the overwrite location can be written in the user area in, e.g., the following format, as in the description of the first embodiment.

```
aligned(8) class UserLastFrameBox extends
FullBox('ulfr', 0, 0) {
        unsigned int(32) last_sample;
        unsigned int(32) overwrite_sample;
}
```

Note that "last_sample" indicates the location of the last frame of a moving image as in the above description, but "overwrite_sample" designates an overwrite location before this last frame location. When the overwrite location is written in the recorded MP4 file in this format, it can be designated in addition to the last frame location.

As a method of designating the overwrite location by the user, various methods such as a method by means of a slider using a GUI, a method of directly designating a time, and the like may be used. When the user designates the overwrite location on the user interface (step S415) displayed upon completion of imaging, a method of displaying a GUI or the like used to designate the overwrite location at that timing may be used.

Figure 10:
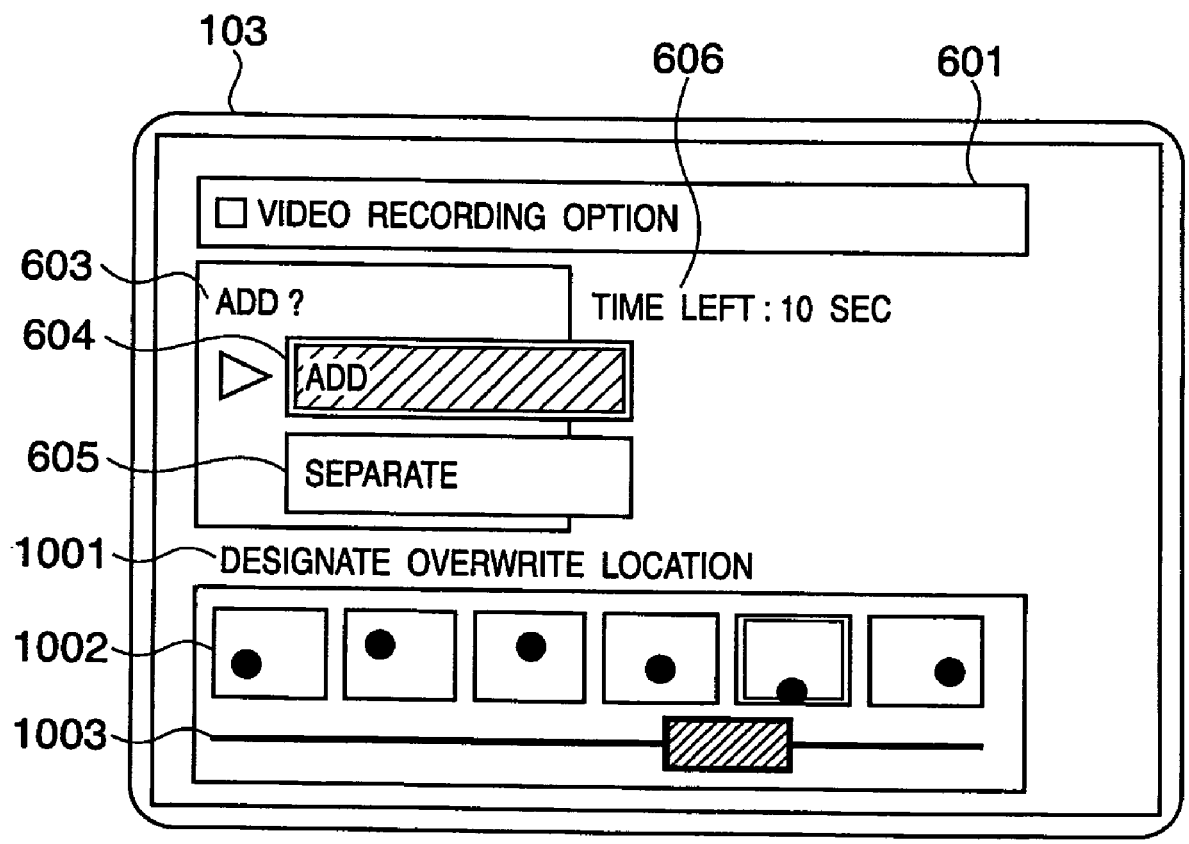
FIG. 10 shows an example of a user interface used to designate an overwrite location.

FIG. 10 shows an example of a user interface used to designate the overwrite location. In FIG. 10, a GUI used to designate the overwrite location is added to the example of the user interface shown in FIG. 6. Under a field 1001 reading "designate overwrite location", a captured image display area 1002 indicating the contents of the recorded MP4 file, and a slider 1003 used to shift the location when the recorded MP4 file cannot be displayed within this display, area are displayed. The user can designate the overwrite location using a frame highlighted by a double frame while moving this slider 1003 using the arrow key 109 and the like.

The file separation processing will be described below.

In case of the overwriting addition processing as well, the addition processing can be implemented by adding media data as new chunks to the recorded MP4 file, and updating the tables of various kinds of information included in the header information 302. The new MP4 file added in this way is the same as the combined MP4 file described in the first embodiment intact, and can be separated by the same processing as in step S417 in the first embodiment.

On the other hand, when the overwriting addition processing is to be executed, since the new MP4 file is the same as the combined MP4 file in the first embodiment intact, processing different from the first embodiment must be executed.

Figure 4:
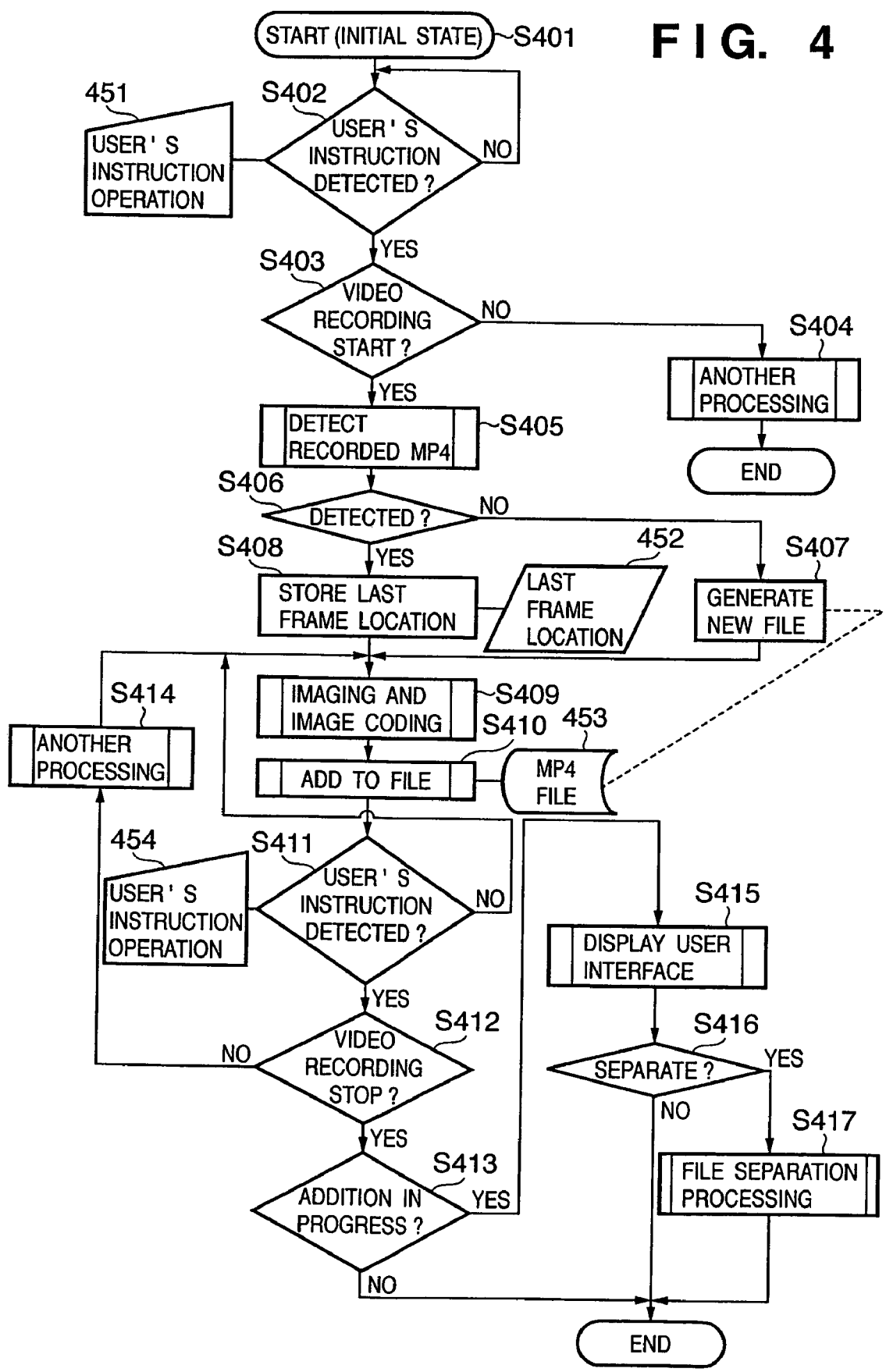
FIG. 4 is a flowchart showing the flow of the operations of the digital camera and user according to the first embodiment.
Figure 11:
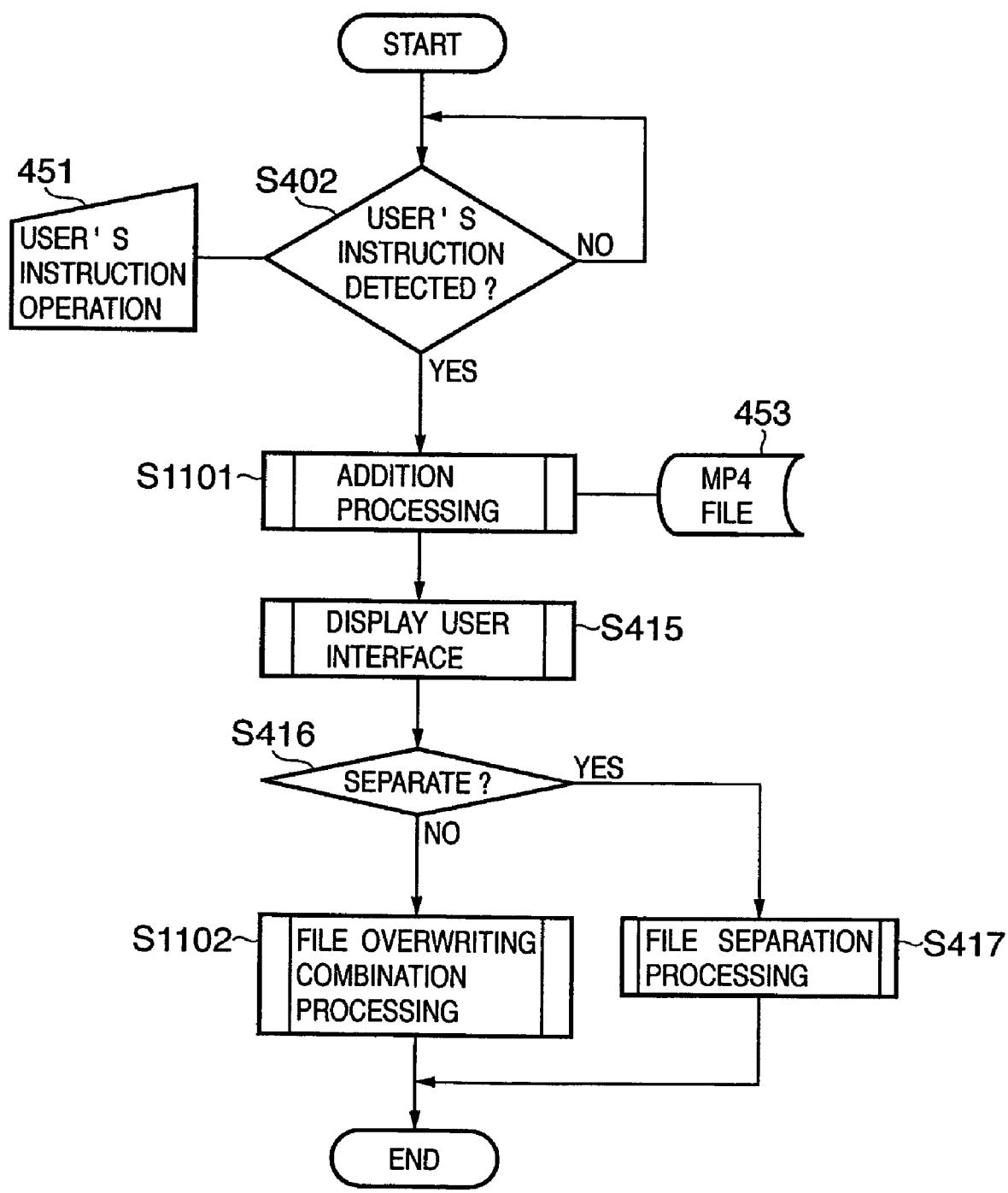
FIG. 11 is a flowchart showing the flow of processing upon overwriting addition of an MP4 file.

FIG. 11 is a flowchart of the overwriting addition processing, which is obtained by altering that of FIG. 4. For the sake of simplicity, FIG. 11 shows common processing steps from the start to stop of video recording as one addition processing step S1101. Also, the same step numbers denote steps that execute the same processes as in FIG. 4, and a description thereof will be omitted.

File overwriting combination processing (step S1102) is executed when it is determined that a file is not to be separated.

The file overwriting combination processing alters the header information 302 with reference to the overwrite frame location, while the file separation processing (step S417) separates and alters the header information 302 with reference to the last frame location.

Figure 12:
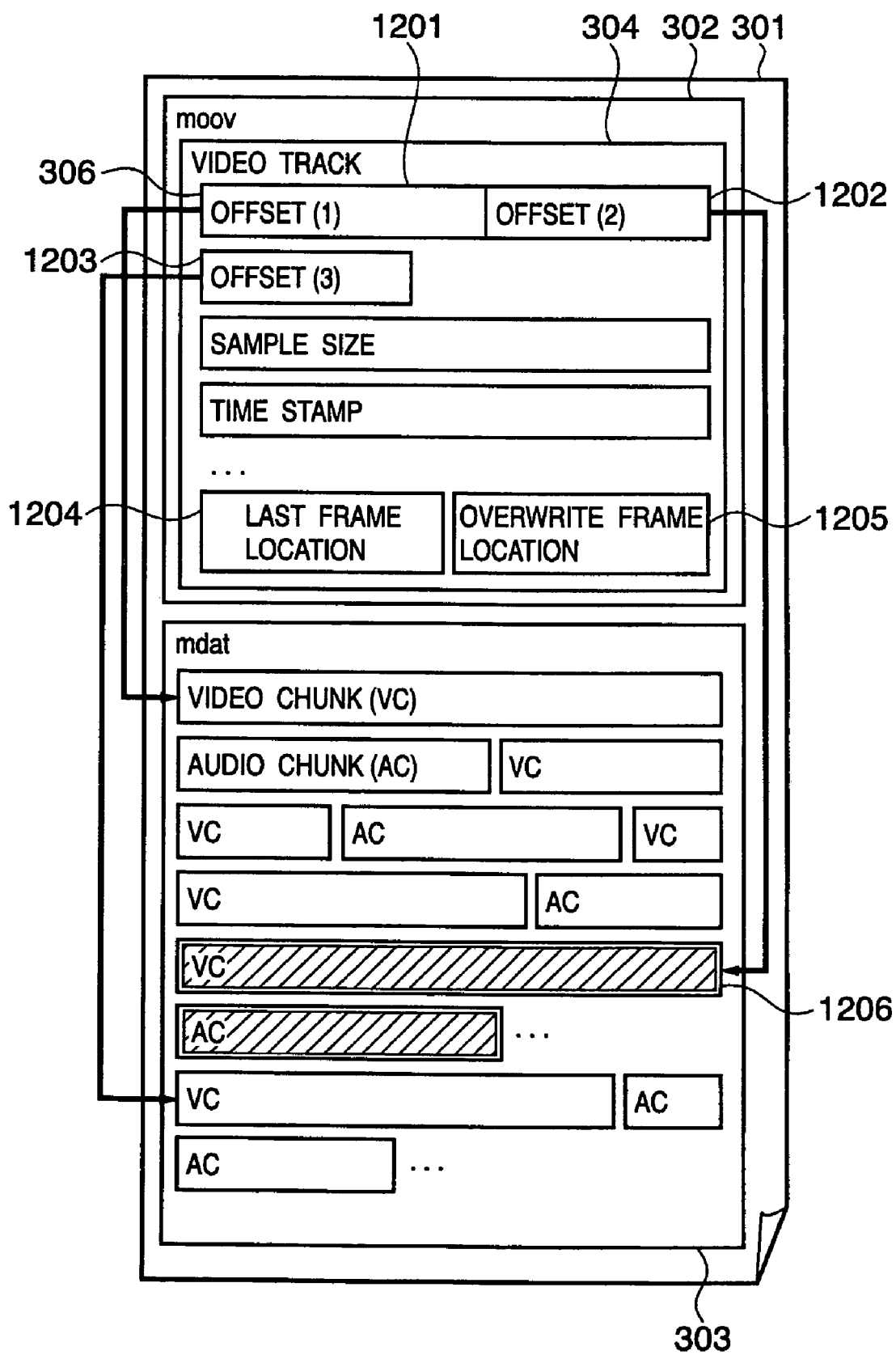
FIG. 12 shows the configuration of an MP4 file upon overwriting addition of an MP4 file.

FIG. 12 shows the configuration of an MP4 file in case of the file overwriting addition processing. FIG. 12 is similar to FIG. 5, but the audio track 305 and the like are omitted for the sake of simplicity. FIG. 12 includes a last frame location 1204 and an overwrite frame location 1205 that designates an overwrite location, as parameters to be described in the MP4 file.

The offset 306 indicates an integrated one of an offset (1) 1201, offset (2) 1202, and offset (3) 1203, which are segmented for the sake of descriptive convenience. The offset (2) 1202 indicates an offset for the overwritten part, and the offset (3) 1203 indicates an offset for the added part. The offset (1) 1201 indicates an offset for the head part of the MP4 file, and includes offset information to a location immediately before the part segmented as the offset (2) for convenience.

As described above, a chunk which includes one or more samples to be overwritten can be detected, so the chunk itself need not be deleted if an offset indicating the chunk which is of no use due to overwriting is deleted from the offset 306.

As a practical method of deleting a part which is referred to as the offset (2) for convenience, one of simplest methods will be explained below although it depends on its implementation method. For the offset 306 which becomes discontinuous due to deletion of a part of offset information, information included in the offset (3) 1203 is moved to the location of the offset (2) 1202, and a free space indicating "unused" is set in a part which becomes empty after movement.

Chucks which are no longer referred to in this way are indicated by hatched double frames as non-reference chunks 1206 in FIG. 12.

As for the sample size and time stamp, data from the overwrite frame location to a location immediately before the last frame location are deleted from the corresponding tables. Also, as for some pieces of information which are not described here, their tables are altered. For example, as for the sample size, since individual sample sizes are held as a table, size information of each sample included in a chunk which is no longer referred to is deleted from the table. This method can be implemented by the same processing as the aforementioned offset.

Overwriting processing from a frame (sample) which is not located at the head in a chunk can be basically implemented by the same processing as the contents described above. However, since the overwriting processing begins from the middle of a chunk, a table indicating samples included in a chunk which is partially overwritten must be changed. In practice, since this information is expressed as the number of samples included in a chunk, it is changed to accurately express the number of samples of a target chunk, thus rewriting data of the table indicating a series of chunks and the sample configuration.

More specifically, in case of the overwriting processing from a frame which is not located at the head in a chunk, the same processing as that from the first frame of a chunk can be applied to chunks other than the chunk including target frames. For this reason, altering processing of a table indicating sample information included in the chunk which includes the target frames (samples) need only be additionally done.

A further detailed explanation of the overwriting processing from a frame which is not located at the head in a chunk will be omitted since it is obvious that such processing need only be correctly done according to the standard.

In this way, media data (chunks) to be overwritten need not be deleted. The media data which becomes unnecessary may be deleted in this stage, or may be deleted upon executing file optimization processing later. If the media data is not deleted, only some little problems such as an increase in file site accordingly and slight drop of file access speed occur.

The header information 302 may be altered when it is added to the file (step S410). In this case, since the file separation processing (step S417) cannot be done in this state, the header information 302 before alteration must be copied to the user area.

In order to alter the header information 302 upon adding to the file (step S410), the overwrite frame location must be designated before the beginning of imaging.

As described above, according to this embodiment, the digital camera 101 adds a new image to be captured from the designated location of the recorded MP4 file to generate a combined MP4 file. Also, in a case where a file is to be separated without generating the combined MP4 file, the digital camera 101 separates the added image from the recorded MP4 file and creates a new MP4 file as in the first embodiment.

In this way, the user can add a moving image more flexibly, and the labor required to edit after imaging can be reduced.

Other Embodiments

The processing of the respective embodiments described above may be attained by supplying a storage medium that records a program code of software which embodies respective functions to a system or apparatus. The functions of the aforementioned embodiments can be implemented by reading out and executing the program code stored in the storage medium by a computer (or a CPU or MPU) of that system or apparatus. In this case, the program code itself read out from the storage medium implements the functions of the aforementioned embodiment, and the storage medium that stores the program code constitutes the present invention. As the storage medium for supplying the program code, for example, a floppy (registered trade name) disk, hard disk, optical disk, magneto-optical disk, and the like can be used. Or CD-ROM, CD-R, magnetic tape, nonvolatile memory card, ROM, and the like can also be used.

The functions of the aforementioned embodiments are implemented not only by executing the readout program code by the computer. The functions of the aforementioned embodiments are also implemented by some or all of actual processing operations executed by an OS (operating system) running on the computer on the basis of an instruction of the program code. Such case is included in the present invention.

Furthermore, the program code read out from the storage medium may be written in a memory equipped on a function extension board or function extension unit, which is inserted in or connected to the computer. After that, the functions of the aforementioned embodiments are implemented by some or all of actual processing operations executed by a CPU or the like equipped on that function extension board or function extension unit. Such case is also included in the present invention.

The present invention is not limited to the above embodiments and various changes and modifications can be made within the spirit and scope of the present invention. Therefore to apprise the public of the scope of the present invention, the following claims are made.

This application claims the benefit of Japanese Application No. 2004-374612, filed Dec. 24, 2004, which is hereby incorporated by reference herein in its entirety.

What is claimed is:

1. A data processing apparatus comprising:
   an obtaining unit which obtains second multimedia data based on a recording start instruction;
   a determining unit which determines a lastly created file, among a plurality of files which are stored in a storage medium, which file includes first multimedia data, as a first file onto which the second multimedia data obtained by said obtaining unit is to be added;
   an addition unit which adds the second multimedia data obtained by said obtaining unit onto the first file;
   an updating unit which updates location information regarding a location in the first file where the second multimedia data is added by said addition unit; and
   a creating unit which creates, if a separation instruction is issued after a recording stop instruction, a second file including the second multimedia data based on the location information updated by said updating unit, said second multimedia data being obtained by said obtaining unit during a period from the recording start instruction to the recording stop instruction and being added onto the first file by said addition unit,
   wherein each of the first multimedia data and the second multimedia data comprises moving image data.

2. The apparatus according to claim 1, wherein each of the first and the second multimedia data further comprises audio data.

3. The apparatus according to claim 1, wherein said addition unit comprises:
   an appending unit which appends the second multimedia data to the first file; and
   a change unit which changes header information of the first file.

4. The apparatus according to claim 1, wherein said updating unit stores the location information within the first file.

5. The apparatus according to claim 1, further comprising:
   a user interface providing unit which provides, upon a reception of the recording stop instruction, a user interface which allows a user to select whether or not to separate the first multimedia data and the second multimedia data; and
   a separation instruction unit which issues the separation instruction, if it is selected in said user interface to separate the first multimedia data and the second multimedia data.

6. The apparatus according to claim 5, further comprising a default setting unit which sets a time-out period and a default operation as to whether or not to issue the separation instruction by said separation instruction unit, wherein in a case where the time-out period has elapsed without selection in said user interface, the separation instruction unit operates in accordance with the default operation.

7. The apparatus according to claim 1, further comprising a condition setting unit which sets a condition required to determine whether or not to issue the separation instruction, and a user interface providing unit which provides a user interface which allows setting by said condition setting unit.

8. The apparatus according to claim 7, further comprising an overwriting adding unit which adds the second multimedia data to the first file by overwriting data from an arbitrary location of the first multimedia data included in the first file,
   wherein said user interface providing unit provides a user interface which allows selection of the arbitrary location.

9. The apparatus according to claim 8, wherein said overwriting adding unit further comprises a unit which records the selected arbitrary location in the first file.

10. The apparatus according to claim 1, wherein the first multimedia data and the second multimedia data are coded by MPEG-4, and the first file and the second file have an MP4 format.

11. A data processing method comprising:
    an obtaining step of obtaining second multimedia data based on a recording start instruction;

a determining step of determining a lastly created file, among a plurality of files which are stored in a storage medium, which file includes first multimedia data, as a first file onto which the second multimedia data obtained in said obtaining step is to be added;

an addition step of adding the second multimedia data obtained in said obtaining step onto the first file;

an updating step of updating location information regarding a location in the first file where the second multimedia data is added in said addition step; and a creating step of creating, if a separation instruction is issued after a recording stop instruction, a second file including the second multimedia data based on the location information updated in said updating step, said second multimedia data being obtained in the obtaining step during a period from the recording start instruction to the recording stop instruction and being added onto the first file by said addition step, wherein each of the first multimedia data and the second multimedia data comprises moving image data.

12. A computer-readable recording medium storing a program for making a computer implement a data processing method of claim 11.

13. The apparatus according to claim 1, wherein said creating unit creates the second file by performing steps comprising:

creating a new file;

reading out, based on the location information, the second multimedia data added by the addition unit from the first file; and writing the read out second multimedia data into the new file.

14. The apparatus according to claim 1, wherein said creating unit creates the second file by performing steps comprising:

creating a new file;

reading out, based on the location information, header information relating to the second multimedia data added by the addition unit from the first file; and writing the header information into the new file.

15. The apparatus according to claim 1, wherein said creating unit comprises:

a changing unit which changes header information of the first file that indicates locations of the first and second multimedia data in the first file such that the header information does not include the location of the second multimedia data which was deleted from the first file by said deleting unit; and a header adding unit which adds header information to the second file, indicating a location of the second multimedia data in the second file.

16. The method according to claim 11, wherein said creating step creates the second file by performing steps comprising:

creating a new file;

reading out, based on the information regarding the location information in the first file, the second multimedia data added in the addition step from the first file; and writing the read out second multimedia data into the new file.

17. The method according to claim 11, wherein said creating step creates the second file by performing steps comprising:

creating a new file;

reading out, based on the information regarding the location information, header information relating to the second multimedia data added in the addition step from the first file; and writing the header information into the new file.

18. The method according to claim 11, wherein said creating step comprises:

a changing step of changing header information of the first file that indicates locations of the first and second multimedia data in the first file such that the header information does not include the location of the second multimedia data which was deleted in said deleting step; and header adding step of adding header information to the second file, indicating a location of the second multimedia data in the second file.

19. A data processing apparatus comprising:

an obtaining unit which obtains second multimedia data;

an addition unit which adds the second multimedia data obtained by said obtaining unit onto a first file including first multimedia data stored in a storage medium;

an updating unit which updates location information regarding a location in the first file where the second multimedia data is added by said addition unit;

a creating unit which creates, upon a separation instruction, a second file including the second multimedia data added to the first file by said addition unit, based on the location information updated by said updating unit; and a control unit which controls said addition unit to add third multimedia data obtained next to the second multimedia data by said obtaining unit onto the second file, in a case where said creating unit created the second file, wherein each of the first multimedia data and the second multimedia data comprises moving image data.

20. The apparatus according to claim 19, wherein said control unit controls said addition unit to add the third multimedia data obtained by said obtaining unit onto the first file, in a case where said creating unit did not create the second file.

21. The apparatus according to claim 1, further comprising a deleting unit which deletes the second multimedia data from the first file onto which the second multimedia data was added by said addition unit, when said creating unit creates the second file including the second multimedia data.

* * * * *